May 19, 1970  W. C. LANGE  3,512,343
GRASS TRIMMER
Filed Nov. 2, 1966  2 Sheets-Sheet 1
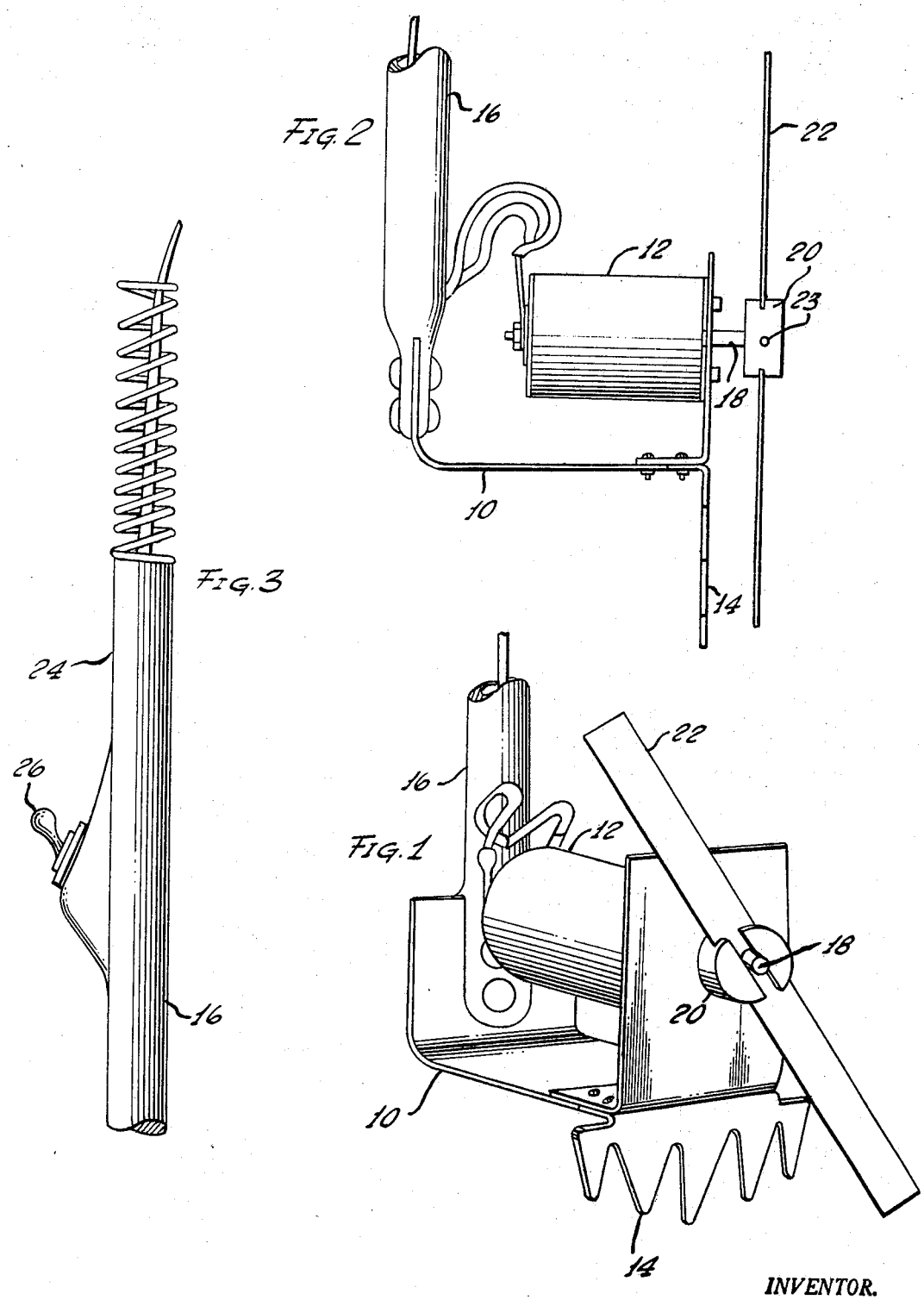
INVENTOR.
BY William C. Lange
Pettibridge, O'Neill & Ambel
Attorneys.

May 19, 1970   W. C. LANGE   3,512,343
GRASS TRIMMER

Filed Nov. 2, 1966   2 Sheets-Sheet 2

INVENTOR.
BY William C. Lange
ATTORNEYS

United States Patent Office 3,512,343
Patented May 19, 1970

3,512,343
GRASS TRIMMER
William C. Lange, 101 Stacy Court, Glenview, Ill. 60025
Filed Nov. 2, 1966, Ser. No. 591,478
Int. Cl. A01d *35/00*
U.S. Cl. 56—25.4          1 Claim

ABSTRACT OF THE DISCLOSURE

A lawn and hedge trimming device, utilizing a low voltage D.C. motor having a low torque and high rotational output in combination with a lightweight trimmer blade. The D.C. motor and trimmer blade combination are capable of cutting grass and similar vegetation, but will not cut or substantially damage objects of greater mass than such vegetation. The trimming device includes a power conversion and voltage reduction system to minimize hazards of operation.

---

This invention relates to lawn and hedge trimming devices and is directed to the trimming of grass, hedges, or the like, utilizing a trimmer of a light weight for ease of manipulative handling. More particularly, the invention is directed to a trimmer having a low voltage, high speed, low torque drive motor for driving a lightweight blade for trimming grass.

Prior art devices of this type utilize normal line voltage or are battery powered to provide the motive force. In the event of damp or wet conditions, line voltage devices are inherently dangerous. Battery powered devices require frequent replacement of the batteries and are relatively heavy due to the added weight of the batteries.

It is an object of the invention, therefore, to provide a trimmer which is safe to operate, more compact and more readily usable by various members of the family including housewives.

It is another object of this invention to provide an inherently safe and lightweight trimmer which avoids the objectionable features of the prior art devices. This is accomplished, as will be more particularly pointed out hereinafter, by the use of a voltage step-down converter located close to the high voltage source and whereby low voltage D.C. is carried by a long lead to the trimmer at the lawn or hedge trimming location.

It is also an object of the invention to provide a relatively safe cutting blade for the trimmer by reducing the torque applied to the cutting blade. It has been established during operation that the trimmer blade when accidentally brought into contact with a person will not produce serious bodily injury due to the low torque of the rotating blade. This results from the use of a lightweight, low torque driven trimming blade. Further, objects struck by the blade will cause it to stop immediately without injury to the object, blade or motor.

Other objects and advantages of the invention will become more fully apparent from the following description and drawings, wherein:

FIG. 1 is a perspective view of the trimmer element of the device of the invention;

FIG. 2 is a side view of the trimmer element shown in FIG. 1;

FIG. 3 is a side view of the upper handle portion of the device of the invention;

Figure 4:
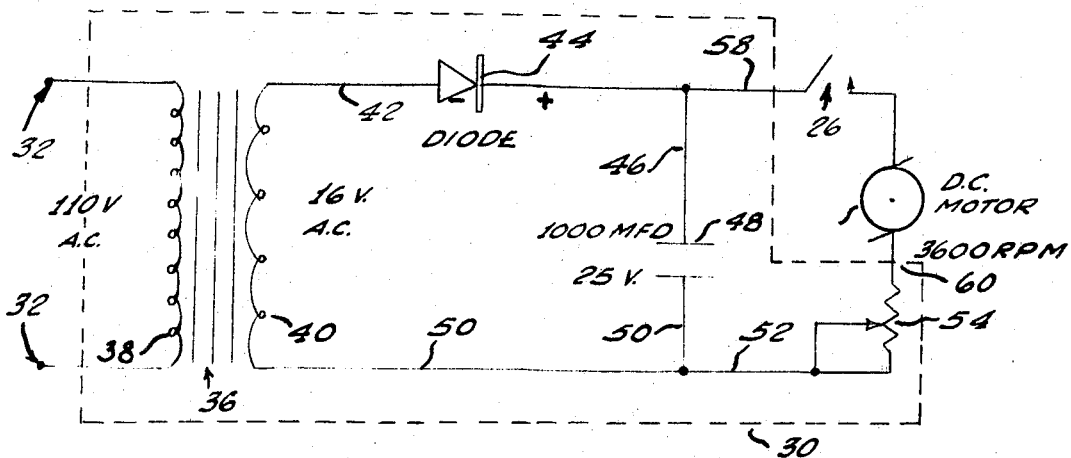
FIG. 4 is a schematic diagram showing the voltage step-down circuit incorporated in the converter of the present invention.

Referring now to FIG. 1, there is shown a generally U-shaped bracket 10, which serves as the mounting frame for D.C. motor 12, blade guide and comb rake 14 and the lower end of control handle 16. The motor 12 has a shaft 18 extending outwardly from the motor supporting bracket 10. A cylinder 20 in which is mounted a cutting blade 22 is fixedly mounted at the end of motor shaft 18 by a set screw 23 projecting through cylinder 20 and into engagement with shaft 18. The cylinder 20 and blade 22 are rotated upon the application of electric power to the motor 12.

Figure 5:
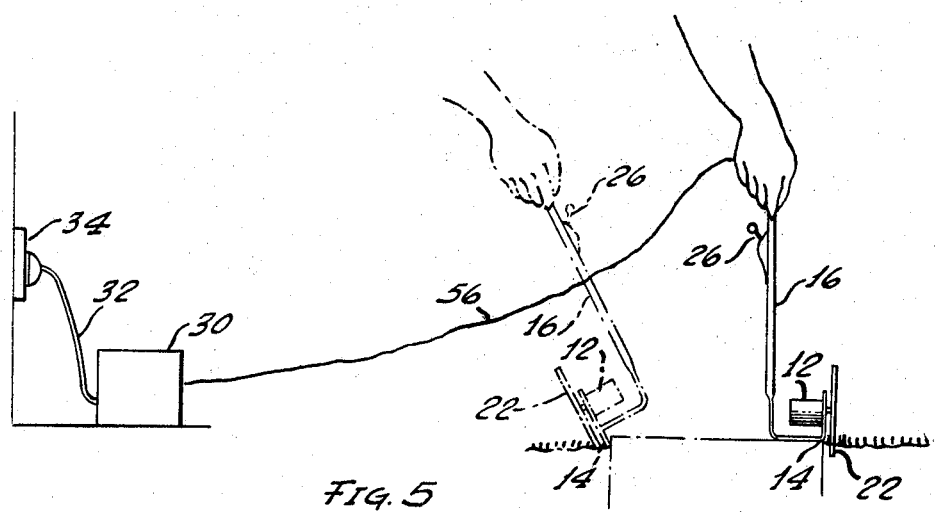
FIG. 5 is a side view in schematic form showing a representative application of the subject invention and a phantom view of an alternative use of the device of the invention.

The handle 16, as is best shown in FIGS. 3 to 5, has a manual retention surface 24 in close proximity to a finger-operated motor control switch 26 to control the operation of the motor 12 and the trimmer blade.

The circuit diagram of FIG. 4 illustrates the circuit of the trimmer device of the invention. The circuit portion enclosed within dashed lines are the components contained within the step-down phase converter 30 shown in FIG. 5. A standard electric power transmitting cord 32 is connected to a common household outlet 34 to provide household line voltage to the step-down phase converter 30. As shown in FIG. 4, a step-down transformer 36 has its primary winding 38 connected to power cord 32 which is shown in FIG. 5 to be plugged into outlet 34.

The low voltage secondary winding 40 has one lead 42 connected to the negative side of diode 44. The positive side of diode 44 is connected by one lead 46 to a capacitor 48, the other side of which is connected by lead 50 to the other side of transformer secondary windings 40. A lead 52 connects the transformer second windings to an adjustable potentiometer or rheostat 54.

The step-down phase converter 30, therefore, serves through step-down transformer 36, diode 44, and capacitor 48 to convert common household 117 volt A.C. to 16 volt D.C. current for operation of D.C. motor 12. Potentiometer or rheostat 54 are then used to control the D.C. current supply to motor 12.

As shown in both FIGS. 4 and 5, a relatively long power cord 56, consisting of leads 58 and 60, connects the converter 30 with the trimmer at the trimming location. Lead 58 is connected to one side of a common toggle or manual switch 26, the other side of which is connected to motor 12.

OPERATION

After power cord 32 has been plugged into exterior outlet 34, the low voltage transformer 36 steps-down the line voltage of approximately 117 volts to a relatively low A.C. voltage of approximately 16 volts. This 16 volt A.C. is then rectified by diode 44 and capacitor 48 to provide a 16 volt D.C. source across leads 52 and 58.

Upon manual activation of switch 26 to its closed position, the motor 12 is energized, causing the trimmer blade 22 to rotate at a relatively high speed which can be controlled by the adjustable potentiometer or rheostat 54. The motor 12 is specifically selected to provide low torque and high speed performance at its output shaft. Due to the unique combination of the small, light weight motor and the use of lightweight materials for the blade 22, handle 16, etc., the entire trimmer unit is easily carried and manipulative for its intended function.

Normally, in trimming the edges of a lawn, the device of the invention is placed, as shown in the full line or phantom illustration of FIG. 5, with the leg connecting portion of the U-shaped mounting bracket 10 resting on the sidewalk or area abutting the lawn edges, as shown in the full line drawing, or, in the alternative, with the rake 14 serving as a guide for blade 22 when it is desired to produce an angular trim, as shown in the phantom portion of FIG. 5. The guide and comb rakes 14 are placed in abutting relationship with the walk, in the first instance, as the operator, using the walk and rakes 14 as an essentially vertical guide manually moves the device parallel to the lawn edge. In the second instance, the device is moved at an angle to the lawn edge, utilizing rakes 14 and the side walk to guide the device. As the device of the invention is moved in either of these manners, high-speed trimming blade 22 trims overhanging blades of grass.

Should the blade strike any object during the trimming operation, the low torque produced by the D.C. motor will cause the blade to stop immediately without damage to the object struck or the blade. Further, such stoppage will not result in a damaged or burned out motor.

The guide and comb rakes 14 can also be used to direct grass uniformly to trimming blade 22 when the device is used in other than edge trimming operations.

What I claim is:

1. A trimming device for lawns and the like comprising in combination a vertically elongated and hollow gripping handle for retention of said device, a U-shaped frame member having a first leg thereof mounted on the lower end of said handle, a D.C. motor mounted on the second leg of said U-shaped frame member and extending laterally between said legs, the connecting portion of said U-shaped frame member serving as a support member, said D.C. motor having an output shaft extending through the corresponding leg of said U-shaped frame member for a predetermined distance, a cylinder member mounted adjacent the outer end of said output shaft, a lightweight trimming blade mounted on said cylinder thereby being rotationally responsive to the rotational movement of said output shaft, a serrated guide member mounted on said U-shaped member extending downwardly below said connecting portion of said U-shaped frame member and in linear relation with said second leg of said U-shaped frame member, an electrical cord connected to said D.C. motor and disposed within said hollow handle, a switch mounted on said handle and connected to said cord for activating and deactivating said trimming device, said D.C. motor having a low torque output capable of high rotational speeds and adapted to be connected to a converter whereby A.C. current is converted to D.C. current at a substantially lower voltage, whereby the combination of the low torque D.C. motor and the lightweight trimming blade cooperate to produce a blade rotational speed sufficient to cut grass and similar vegetation but insufficient to damage any object having a mass greater than such vegetation.

References Cited

UNITED STATES PATENTS

| | | | |
|---|---|---|---|
| 2,630,665 | 3/1953 | Lauer | 56—256 |
| 2,612,741 | 10/1952 | McKay | 56—256 X |
| 2,718,742 | 9/1955 | Tangeman | 56—256 X |
| 2,718,743 | 9/1955 | Smith et al. | 56—256 X |
| 2,767,540 | 10/1956 | Corbin | 56—256 X |
| 3,005,141 | 10/1961 | Emmons | 320—2 |
| 3,089,071 | 5/1963 | Hartwig. | |
| 3,221,481 | 12/1965 | Mattson et al. | 56—256 X |
| 3,344,899 | 10/1967 | Wang et al. | 320—2 |
| 2,910,225 | 10/1959 | Whitling | 230—259 |
| 3,164,177 | 1/1965 | Merl | 144—1 |
| 3,304,969 | 2/1967 | McDougall | 144—1 |

RUSSELL R. KINSEY, Primary Examiner

U.S. Cl. X.R.

56—256